United States Patent [19]

Mizukoshi et al.

[11] Patent Number: 4,802,261
[45] Date of Patent: Feb. 7, 1989

[54] CLAMP BAND

[75] Inventors: Yasumasa Mizukoshi, Fujisawa; Minoru Ishijima, Maebashi, both of Japan

[73] Assignee: Nippon Seiko Kabushiki Kaisha, Tokyo, Japan

[21] Appl. No.: 918,135

[22] Filed: Oct. 14, 1986

[30] Foreign Application Priority Data

Jan. 16, 1986 [JP] Japan .................................. 61-5137

[51] Int. Cl.$^4$ ............................................. B65D 63/02
[52] U.S. Cl. .................................. 24/20 TT; 24/20 R; 24/20 EE
[58] Field of Search ......... 24/20 TT, 20 EE, 20 CW, 24/23 W, 23 EE

[56] References Cited

U.S. PATENT DOCUMENTS

| | | | |
|---|---|---|---|
| 235,273 | 12/1880 | Miller | 24/20 EE |
| 1,261,221 | 4/1918 | Dutcher | 24/20 TT |
| 1,579,719 | 4/1926 | Lavender | 24/20 TT |
| 3,154,330 | 10/1964 | Clark et al. | 24/20 TT |
| 3,293,709 | 12/1966 | Holton | 24/20 TT |
| 4,226,007 | 10/1980 | Duenser | 24/20 EE |
| 4,492,004 | 1/1985 | Oetiker | 24/20 TT |

FOREIGN PATENT DOCUMENTS

106814 3/1939 Australia .......................... 24/20 EE
11627 4/1908 United Kingdom ............. 24/23 W Primary Examiner—Victor N. Sakran
Attorney, Agent, or Firm—Shapiro and Shapiro

[57] ABSTRACT

A clamp band has a pair of end portions formed in a loop-like shape around a cylindrical clamp member mounted on a member to be clamped and overlapped with each other and imparted a tangential clamping force and engaged with each other to clamp the clamp member to the member to be clamped. The first end portion which is the outer side during overlapping is formed with a first projection projectedly provided radially inwardly and a first clamping force imparting portion to which a clamping force is imparted during clamping, and the second end portion which is the inner side during overlapping is formed with a second projection projectedly provided radially outwardly and engaged with the first projection and a second clamping force imparting portion which is located more adjacent to the side opposite to the fore end of the second end portion than the second projection and to which a clamping force is imparted during clamping, and during clamping, a tangential clamping force is imparted to the first and second clamping force imparting portions to increase the amount of overlap, and the first and second projections are brought into engagement with each other to support a circumferential force, thereby clamping the clamp member to the member to be clamped.

16 Claims, 8 Drawing Sheets

CLAMP BAND

BACKGROUND OF THE INVENTION

1. Field of the Invention

This invention relates to improvements in a clamp band used to clamp and fix a cylindrical member formed of an elastic material to a fixed member having a cylindrical surface.

2. Related Background Art

A clamp band formed of band steel or the like is used to clamp and fix a cylindrical boot, a cover, etc. to a fixed member having a circumferential surface such as the transmission shaft of a vehicle. One known band of this type is designed to be clamped around the outer peripheral surface of a cover cylinder. The band's opposite end portions are initially not coupled to each other but are made into a loop-like shape during clamping. Thus, it is necessary that the clamp band be provided, at the respective end portions, with a tool engaging portion to be engaged by a clamp tool during clamping and connecting portions which engage each other when clamping is terminated.

As regards the connecting portions, it is desirable that they can be simply formed and be of great strength. According to the prior art, it has often been the practice to provide the connecting portions by forming a substantially U-shaped cut-out in one of the end portions of a band and forming a connecting aperture in the other end portion. The ends are connected by bending up the band portion surrounded by the cut-out to the edge portion of the connecting aperture. The upwardly bent portion projects obliquely from the band body by a considerable amount. By connecting the edge portion of the connecting aperture to the upwardly bent connecting projection, the end portions can be brought into intimate contact with each other and can be prevented from being separated from each other.

Because the connecting projection is formed simply by bending up a tongue-like portion, its strength is often not sufficient. Also, it is sometimes the case that after being engaged with the edge portion of the connecting aperture, the connecting projection is deformed (further cocked up in the upright direction), and the great amount of radial protrusion thereof from the connecting aperture may cause the danger of contacting or interfering with the operator's band or the surrounding members.

It has also often been the case that the tool engaging portions are formed on the end portions of the band in the same manner as the above-described connecting projection such that a tool may be engaged with the free end of the bent-up tongue-like portion. The tool engaging portions formed in this manner have a great amount of protrusion from the band body which leads to the ease with which the tool is brought into engagement with the tool engaging portions. However, for the reason set forth above, the tool engaging portions have poor strength and therefore may be deformed or damaged by the friction force acting between the band and the boot or the like being clamped (which friction force may become considerably great depending on the position of the tool engaging portions).

SUMMARY OF THE INVENTION

The present invention has for its primary object to overcome the disadvantages peculiar to the prior art, that is, to provide a clamp band having a pair of free end portions for clamping the outer peripheral surface of a cylindrical member formed of an elastic material, each of said free end portions being formed with a connecting portion and a tool engaging portion, said connecting portions and said tool engaging portions having a sufficient degree of strength such that they are not deformed or damaged after clamping and during the engagement by a tool.

It is another object of the present invention to provide a clamp band such that the amounts of radial protrusion of said connecting portions and said tool engaging portions are minimized (are made smaller than the sum of the thicknesses of the end portions overlapped with each other) and such that the formation of these portions and the clamping operation itself can be accomplished as easily as in the prior art.

In the present invention, the band end portions are overlapped with each other during clamping, with the first end portion being outside. The first end portion is formed with an inwardly projecting first projection and a first tool engaging portion provided more adjacent to the fore end of said first end portion than said first projection. The tool engaging portion may be the end edge of a rectangular aperture. The second end portion is formed with an outwardly projecting second projection and a second tool engaging portion provided to the rear of the second projection. The second tool engaging portion may be the end edge of a protuberance adjacent to a rectangular aperture. The second end portion is further provided with retaining means for restraining said first end portion and preventing it from drifting outward. During clamping, a tool is brought into engagement with the first and second tool engaging portions to draw the end portions toward each other, and the first projection and the second projection are engaged with each other at their back sides to support a circumferential force. The second end portion is prevented from drifting out (separating) from the first end portion by the retaining means.

According to the present invention, a clamp band may be clamped and fixed onto a member to be clamped, and neither the connecting projections nor the tool engaging portions are deformed because they are of great strength. Thus, the two end portions are prevented from separating from each other. Further, the diameter of the swing circle of the outer periphery of the band is minimized to avoid the interference thereof with surrounding parts. In addition, the clamp band can be manufactured inexpensively.

The invention also overcomes another problem which may be experienced when connecting portions are formed at positions substantially rearward of the respective tip portions of a clamp band's free ends—namely, radially outward drifting of the tip portion of the free end which is overlapped to the outside. Such drifting causes the swing circle of the outer periphery of the clamp band to become larger, and this may give rise to the undesirable possibility that the end portion which has drifted out will interfere with the surrounding members.

Accordingly, it is also an object of the present invention to provide a clamp band in which the outside end portion of the clamp band is prevented from drifting radially outwardly after completion of clamping. Furthermore, it is an object of the invention to provide a clamping method using such a clamp band and a clamp tool suitable for clamping such a clamp band.

According to the present invention, the outside end portion is engaged at its fore end with the inside end portion. This not only avoids the undesirable possibility that the outside end portion will drift up to interfere with surrounding members after clamping is effected, but also the outer diameter of the band can be minimized as required. Also, the clamp band is clamped by a clamping force being applied between a pair of clamping force acting portions which are circumferentially to either side of the first and second connecting portions. This simplifies clamping and ensures that the first and second connecting portions are reliably engaged. Also, one of the two engaging portions of the clamp tool automatically comes out of engagement with the clamping force acting portion of the clamp band after termination of permanent clamping so that, the clamping operation is easily performed.

DESCRIPTION OF THE PREFERRED EMBODIMENTS

Figure 1:
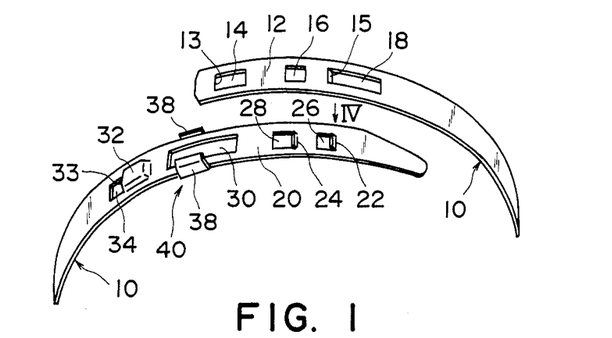
FIGS. 1 to 7 show a first embodiment of the present invention, FIG. 1 being a perspective view showing the two end portions of a clamp band before clamping, FIG. 2 being a cross-sectional view showing the state of provisional clamping, FIG. 3 being a cross-sectional view showing the state of permanent clamping, FIG. 4 being a view taken along the arrow IV in FIG. 1, FIG. 5 being a cross-sectional view taken along the line V—V in FIG. 2, FIG. 6 being a cross-sectional view taken along the line VI—VI in FIG. 3, and FIG. 7 being an enlarged view of the portion VII in FIG. 3.
Figure 2:
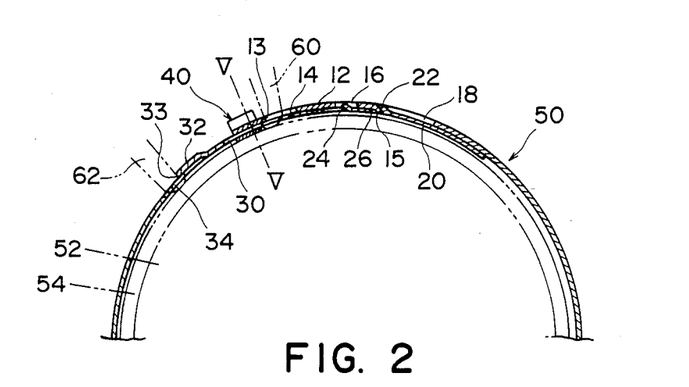
Figure 3:
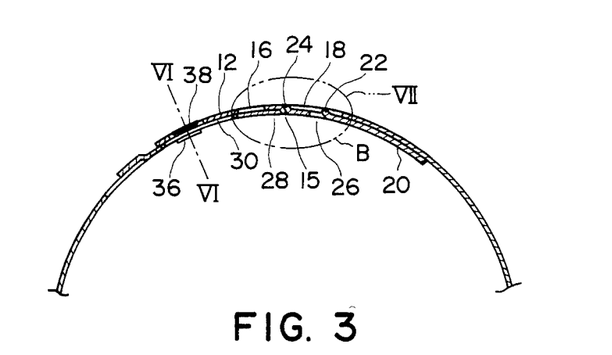
Figure 4:
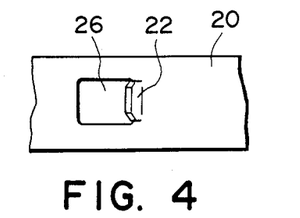

Some embodiments of the present invention will hereinafter be described with reference to the drawings. As shown in FIGS. 1 to 3, a band body 10 formed of band steel has a pair of free end portions 12 and 20. One of these end portions 12 is formed, in succession from the end, with a rectangular aperture 14 of medium length, a short aperture 16, a projection 15 formed by inwardly bending a tongue-like piece, and a long aperture 18. The other end portion 20 takes a tapered shape and is formed with projections 22 and 24 formed by outwardly bending tongue-like pieces, rectangular apertures 26 and 28 (see also FIG. 4) adjacent to the projections 22 and 24, an elongated rectangular aperture 30, a tunnel-like protuberance 32, and a rectangular aperture 34 adjacent to the protuberance 32. A retaining member 40 comprising a bottom 36 (FIG. 5) and a pair of bent portions 38 is integrally secured to the back of end portion 20 by spot welding to that part of the end portion 20 which is formed with the elongated aperture 30. The band body 10 and the retaining member 40 together constitute a clamp band 50.

Description will now be made of a method of clamping and fixing a rubber boot 54 to the transmission shaft 52 of a vehicle by the clamp band 50 of the present embodiment.

The clamp band 50 before use is bent so that the side thereof on which the projections 22 and 24 protrude is the outer side. Accordingly, when the rubber boot 54 is wrapped in the opposite end portions 12 and 20 and a suitable portion of the clamp band 50 is manually pressed toward the rubber boot 54, the diameter of the band is decreased and the band body 10 comes into contact the rubber boot 54. The end portions 12 and 20 are overlapped with each other so that the end portion 12 is outside the end portion 20.

At this time, as shown in FIG. 2, the end portion 12 is inserted and held between the somewhat inwardly bend portions 38 (see FIG. 5) of the retaining member 40 and at the same time, the outer surface of the projection 15 formed inwardly on the end portion 12 and the inner surface of the projection 22 formed outwardly on the end portion 20 are brought into engagement with each other to thereby effect provisional clamping. In this state, the projection 15 is fitted in the aperture 26 and the projection 22 is fitted in the aperture 18, but they do not protrude inwardly or outwardly from the apertures 26 and 18. Also, substantially simultaneously with the projection 22 being fitted in the aperture 18, the projection 24 is fitted in the aperture 16, and the two projections 22 and 24 come into contact with the opposite side edges of the apertures 16 and 18, thereby preventing the end portions 12 and 20 from deviating relative to each other laterally thereof.

Figure 5:
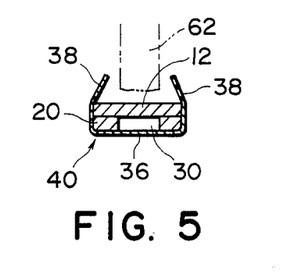

In the state of provisional clamping, as is apparent from FIG. 2, the aperture 14 in the end portion 12 and the aperture 30 in the end portion 20 are in register with each other at a circumferential portion. As indicated by dots-and-dash lines in FIG. 2, an engaging portion 60 of the fore end of a clamp tool is inserted into these apertures and is brought into engagement with the end edge 13 of the aperture 14 while, at the same time, another engaging portion 62 is inserted into the aperture 34 and brought into engagement with the end edge 33 of the protuberance 32 whose inner surface is tunnel-shaped. A force is applied in a direction in which the length of the overlapping portions of the end portions 12 and 20 becomes greater. Thereupon, as viewed in FIG. 2, the end portion 12 is displaced leftwardly and the end portion 20 is displaced rightwardly. The band diameter is thus gradually decreased and the rubber boot 54 is pressed onto the transmission shaft 52 by the clamp band 10. As the clamping by the tool progresses, said one engaging portion 60 passes through the space between the bent portions 38 of the retaining member 40

Figure 6:
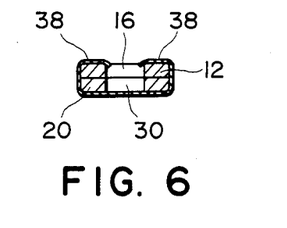

(see FIG. 5), and the tip end of the portion 12 arrives at the side of the engaging portion 32. In the meantime, the projection 15 rides across the projection 24 and fits into the aperture 28, and the outer surface thereof comes into engagement with the inner surface of the projection 24, whereupon substantial clamping is terminated. Since the projection 22 remains fitted in the aperture 18, they guide each other to thereby prevent widthwise deviation between the band end portions 12 and 20 during clamping. Subsequently, the engaging portions 60 and 62 of the tool are removed and, as shown in FIG. 6, the bent portions 38 of the retaining member 40 are bent inwardly and brought into engagement with the side edges of the aperture 16, whereby permanent clamping is terminated, and the rubber boot 54 is firmly fixed to the transmission shaft 52 by the clamp band 50. THe aperture 30 provides an escape aperture for the engaging portion 62 of the tool, but this aperture 30 is not always necessary because the end portion 12 is situated outside and may be displaced slightly outward in the radial direction.

As is apparent from the foregoing description, the aperture 14 in the end portion 12 provides an aperture for receiving the engaging portion 60 of the tool, and the end edge 13 of the aperture 14 provides a portion engaged by the engaging portion 60 of the tool. Also the aperture 16 provides an escape aperture for the projection 24 during provisional clamping and an escape aperture for the projections 22 and 24 during permanent clamping and further provides a guide slot for the projection 24 and a means for preventing widthwise deviation. The projection 15 provides a projection for provisional clamping and permanent clamping. As to end portion 20, the aperture 26 in the end portion 20 provides an escape aperture for the projection 15 during provisional clamping, the aperture 28 provides an escape aperture for the projection 15 during permanent clamping, the aperture 30 provides an escape aperture for the engaging portion 60 of the tool, and the aperture 34 provides an aperture for receiving the engaging portion 62 of the tool. Additionally projection 22 provides a projection for provisional clamping, the projection 24 provides a projection for permanent clamping, and the end edge 33 of the protuberance 32 provides a portion engaged by the engaging portion 62 of the tool.

The advantageous features of the present embodiment include those as follows. First, the clamp band 50 comprises two members, i.e., the band body 10 and the retaining member 40, so the band body 10 can be manufactured simply and inexpensively by pressing a piece of band steel. Therefore, the manufacturing cost of the clamp band 50 can be reduced. Also, when the clamp band 50 is manually curved around the rubber boot 54 to thereby effect provisional clamping and thereafter permanent clamping is effected by means of a manually operated or automatic clamp tool, the projection 15 and the projection 24 will be automatically engaged with each other at the moment when the projection 15 has ridden across the projection 24, because the projection 15 positively shifts inwardly due to the tension of the band body 10. Accordingly, each clamping phase can be accomplished easily, without special skills and clamping becomes reliable. Also, during permanent clamping, the contacting portions of the engaging surfaces of the projections 15 and 24 which support the tension of the band become positioned near the inner surface of the outside end portion of the band and the outer suface of the inside end portion of the band (the contacting surfaces overlapping each other) and this tension is supported by the shearing resistance of the roots of the bent portions of the projections 15 and 24. Therefore, the projections are not deformed and further bent, and they provide reliable engaging portions.

Figure 7:
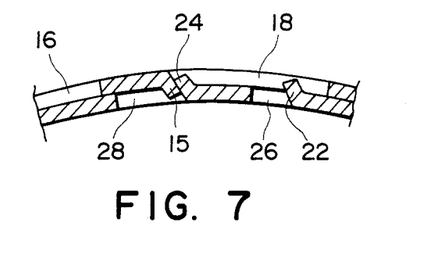

Also, the tool engaging portions, edges 13 and 33, engage portions 60 and 62 of the tool over a wide widthwise area and therefore have such high strength that they are not deformed by the clamping force applied by the tool. Further, in the state of permanent clamping, as is apparent from FIG. 7, none of the projections 15, 22 and 24 protrudes from the inner peripheral surface or outer peripheral surface of the band body 10. Thus, the swing circle of the outer periphery becomes small, interference with the surrounding members is prevented and the rubber boot 54 is not injured by the clamp band 50. This has become possible by the fact that, first, the heights of the projections 22, 24 and 15 are minimized and these projections are utilized only to connect the end portions 12 and 20 together, and second, outward drifting of the end portion 12 is controlled by the retaining member 40.

Also, during permanent clamping, the first and second end portions 12 and 20 are drawn toward each other substantially in the tangential direction of the rubber boot 54 at positions proximate to each other. Therefore, friction between the rubber boot 54 and the clamp band 50 is small and the rubber boot 54 is not damaged. This simplifies the clamping procedure.

Figure 10:
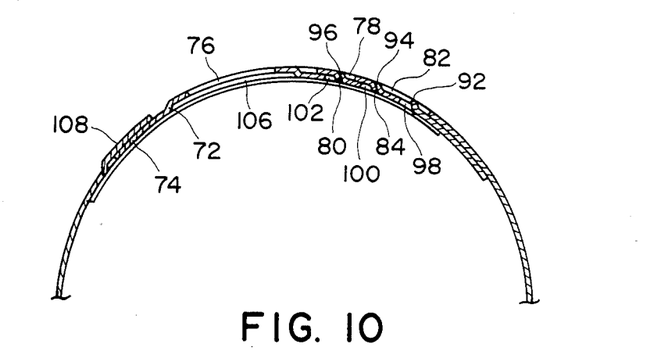
Figure 11:
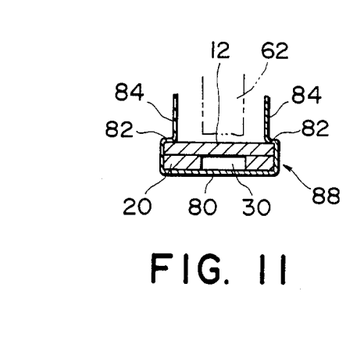
FIGS. 11 and 12 show a modification of a retaining member and correspond to FIGS. 5 and 6, respectively.
Figure 12:
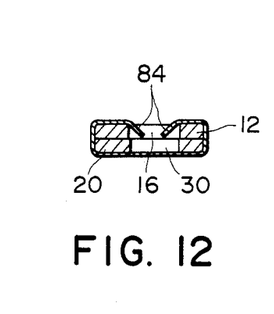

FIGS. 11 and 12 show another form of retaining member. This member 88 has a bottom 80 and a pair of bent portions 84 each having a stepped portion 82 formed in the intermediate portion thereof, as shown in FIG. 10. During provisional clamping, the end portions 12 and 20 may be slipped by and between the bottom 80 and the stepped portion 82, and during permanent clamping, the engaging portion 60 of the tool may be passed between the upright bent portions 84. After the termination of permanent clamping, the bent portions 84 may be bent inwardly and brought into engagement with the side edge of the aperture 16, as shown in FIG. 12.

Figure 8:
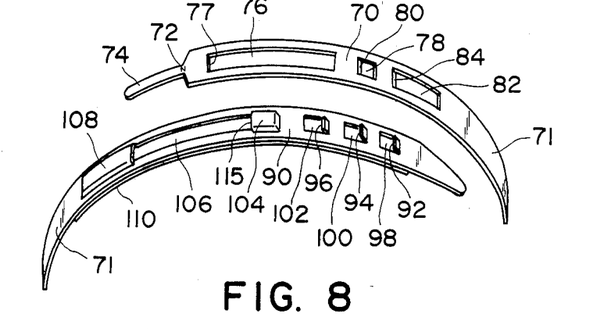
FIGS. 8 to 10 show a second embodiment of the present invention, FIG. 8 being a perspective view of the two end portions before clamping, and FIGS. 9 and 10 being cross-sectional views showing the state of provisional clamping and the state of permanent clamping, respectively.

Another embodiment of the present invention will now be described with reference to FIGS. 8 to 10. At the fore end of one end portion 70, there is provided a protrusion 74 narrower than the end portion 70 and formed with an inwardly directed stepped portion 72 between said protrusion and the end portion 70. Inwardly from stepped portion 72 lengthwise of the band, there are formed a rectangular long aperture 76, a short aperture 78, an inwardly directed projection 80, an aperture 82 of medium length and an inwardly directed projection 84. In contrast, in the other end portion 90, there are formed three outwardly directed projections 92, 94 and 96, three rectangular apertures 98, 100 and 102 adjacent to the respective projections, a protuberance 104 provided with a short tunnel-like void under the inner surface thereof, an elongated rectangular aperture 106, and a protuberance 108 provided with a long tunnel-like void under the inner surface thereof. A metal back plate 110 having substantially the same width as the end portion 90 and longer than the circumferential distance from the projection 92 to the protuberance 108 is secured to the end portion 90 by being spot-welded to the end portion 90 at a predetermined part thereof, and covers the apertures 98, 100, 102 and 106 from the inner peripheral surface side.

Figure 9:
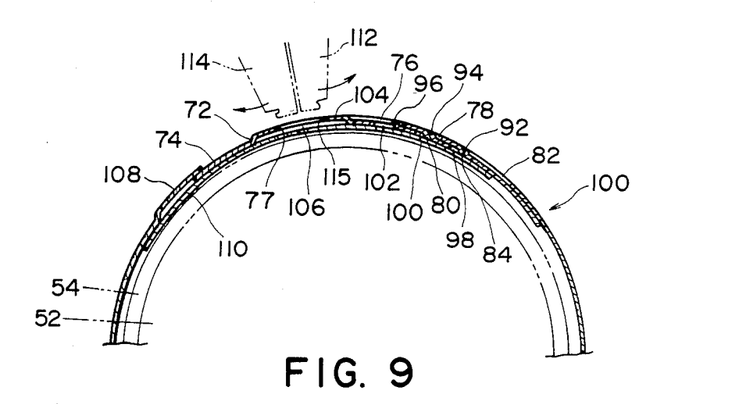

In the present embodiment, provisional clamping may be effected by overlapping end portions 70 and 90 and bringing the projections 80 and 84 into engagement with the projections 94 and 92, respectively, as shown in FIG. 9. At this time, the projections 80 and 84 are fitted into apertures 100 and 98, which serve as escape apertures, and the projections 94 and 92 are fitted into the apertures 78 and 82, which also serve as escape apertures. Also, the projection 96 is fitted into the aperture 76 and comes into contact with the side edge thereof to thereby prevent widthwise relative deviation between the end portions 70 and 90. The protrusion 74 extends slightly into the entrance portion of the protuberance 108, whereby the outward drifting of the end portion 70 is prevented, and the aperture 76 and the aperture 106 are in register with each other at a portion thereof.

Subsequently, one engaging portion 114 of a tool is brought into engagement with the end edge 77 of the aperture 76 and another engaging portion 112 is brought into engagement with the end edge 115 of the protuberance 104, and a force is applied so that the engaging portions 112 and 114 move apart as indicated by arrows in FIG. 9. Thereupon, as viewed in FIG. 9, the end portion 70 is displaced leftwardly and the end portion 90 is displaced rightwardly, and the projections 80 and 84 ride across the projections 96 and 94, respectively. Thereafter, projections 80 and 84 fit into the apertures 102 and 100, respectively, and come into engagement with the projections 96 and 94, respectively, thereby bringing about a state of permanent clamping. At this time, the projection 92 fits in the aperture 82 and the protrusion 74 is deeply inserted in the tunnel-like protuberance 108. The back plate 110 prevents the rubber boot 54 from being elastically deformed during permanent clamping so that the boot will not come into and close the aperture 98, 100, 102 or 106 in the end portion 90 or hamper the fitting of the projections 80 and 84 or the insertion of the protrusion 74 into these apertures.

The differences of the present embodiment from the previous embodiment are that the back plate 110 is provided, that the retaining member 40 is eliminated and instead, the protrusion 74 and the protuberance 108 are formed, that the end edges 77 and 115 are constructed for the use with a clamping tool having engaging portions 112 and 114 which spread to effect clamping, and that the two projections 80 and 84 are formed on the end portion 70 side and the three projections 92, 94 and 96 are formed on the end portion 90 side.

Again in the present embodiment, as in the previous embodiment, the projections 80 and 96 and the projections 84 and 94 engaged with each other during permanent clamping have great strength and do not protrude from the inner and outer peripheral surfaces of the band body 71. Also similarly to the previous embodiment, the end edges 115 and 77 engaged by the engaging portions 112 and 114 of the tool are wide and of large area so that they have great strength and are not deformed during permanent clamping.

Still another embodiment of the present invention will now be described.

Figure 13:
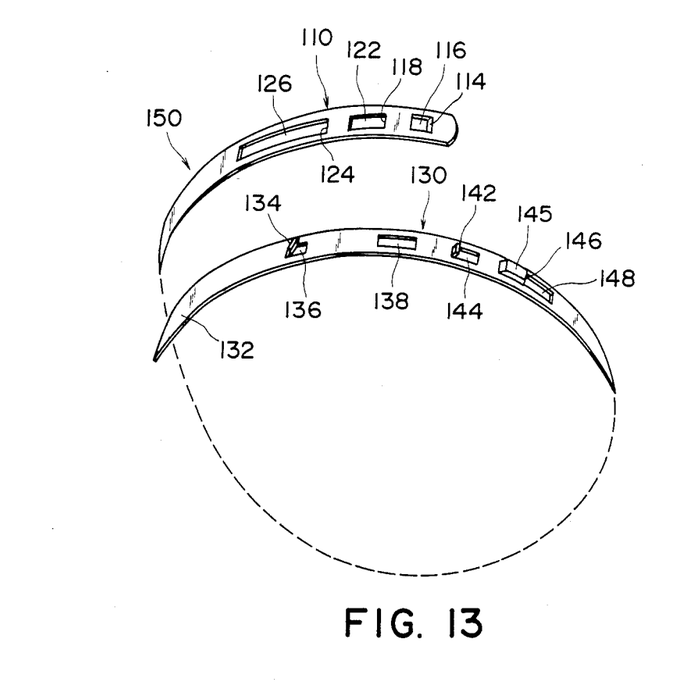
FIG. 13 is a perspective view showing a third embodiment of the clamp band according to the present invention.

As shown in FIG. 13, a clamp band 150 formed of band steel has a pair of end portions 110 and 130, and the end portion 110 which is the outer side during clamping is formed, in succession from the fore end thereof, with a connecting projection 114 for permanent clamping, an aperture 116 adjacent thereto, an escape aperture 122 (for a clamp tool) having one end edge 118 as a clamping force acting portion, and a long aperture 126 having one end edge 124 as a provisional clamping portion to be engaged by a clamping projection 134 which will be described later. The projection 114 is formed radially inwardly near the fore end of the end portion.

On the other hand, the fore end 132 of the end portion 130 which is the inner side during clamping is tapered, and the end portion 130 is formed, in succession from the fore end thereof, with a provisional clamping projection 134, an aperture 136 adjacent thereto, an escape aperture 138 for the clamp tool, a connecting projection 142 for permanent clamping, an aperture 144 adjacent thereto, a clamping force acting portion 146 comprising one end edge of a protuberance 145 protuberant radially outwardly in the shape of a tunnel, and an escape aperture 148 for the clamp tool adjacent thereto. As compared with the first end portion 110, these elements are formed in a part of the end portion 130 which is somewhat further rearward from the fore end thereof. The connecting projections 134 and 142 are formed radially outwardly. The protuberance 145 is situated rearward from the permanent clamping projection 142. Thus, the clamping force acting portion 118 will be within the region where the band end portions overlap and clamping force acting portion 146 will not.

Figure 15:
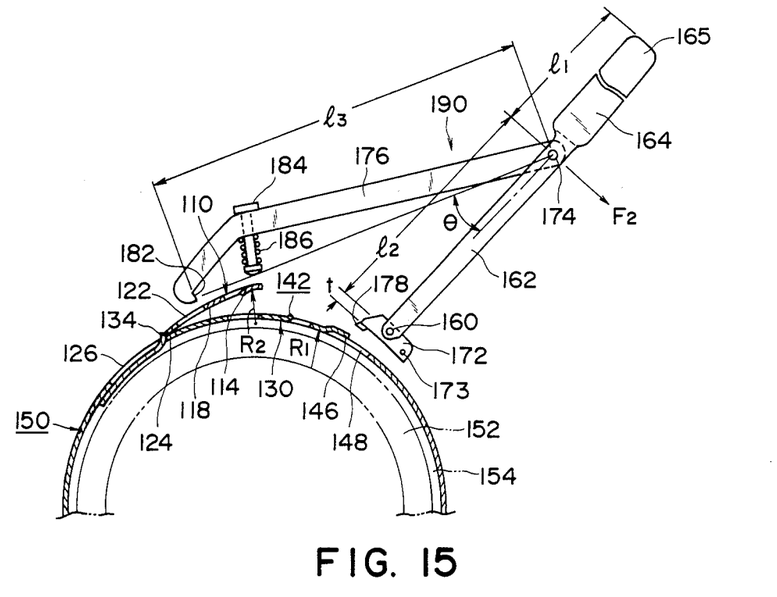
FIG. 15 is a front view showing the relation between the provisionally clamped clamp band and the clamp tool (the clamp band being shown in cross-section).

Reference is now had to FIG. 15 to describe a method of clamping and fixing a rubber boot 154 to the transmission shaft 152 of a vehicle by the use of the clamp band 150.

The clamp band 150 before use is bent so that the side from which the projections 134 and 142 protrudes faces outward and the side from which projection 114 protrudes faces inward. Then, as shown in FIG. 15, the rubber boot 154 is wrapped in the end portions 110 and 130 and a suitable portion of the clamp band 150 is manually pressed toward the rubber boot 154. Thereupon, the clamp band 150 is reduced in diameter and comes into contact with the rubber boot 154. The end portions 110 and 130 are caused to overlap each other so that the end portion 110 lies outside the end portion 130. Then, the second projection 134 for provisional clamping is fitted into the aperture 126 and brought into engagement with the first provisional clamping portion 124 which is one end edge of the aperture 126. Thus, provisional clamping is completed. When possible, the band 150 may be brought into the state of provisional clamping in advance at another location, whereafter it may be axially inserted onto the boot 154.

Figure 14:
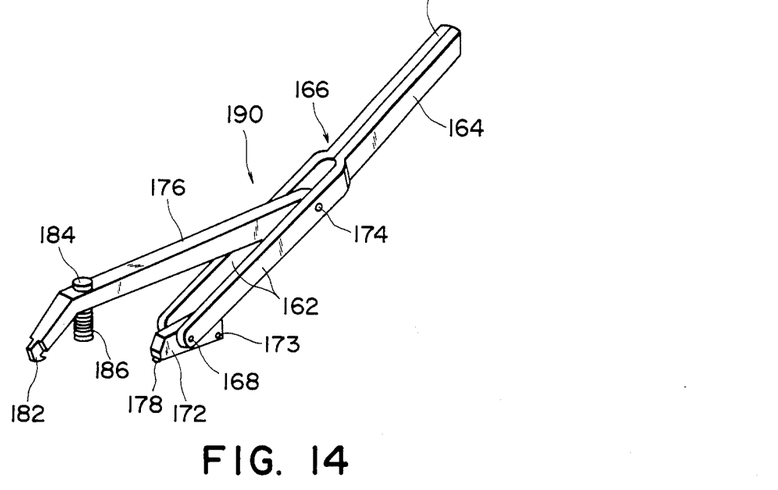
FIG. 14 is a perspective view of a clamp tool used for permanent clamping.

To effect permanent clamping of the thus provisionally clamped clamp band 150, a clamp tool is used, and this clamp tool will now be described with reference to FIG. 14. The clamp tool 190 comprises a body 166 comprising a bifurcated portion 162 and a grip portion 164, an engaging piece 172 having its intermediate portion pivotally connected to the fore end of the bifurcated portion 162 by a pin 168, and an engaging arm 176 having one end pivotally connected to the root of the bifurcated portion 162 by a pin 174. The engaging piece 172 has a second engaging portion 178 at the fore end thereof, and the engaging arm 176 has its other end (free end) bent toward the engaging portion 178 and has a hook-like second engaging portion 182 at the fore end thereof. On that portion of the engaging arm which is somewhat rearward from the fore end, a pressing member 184 is mounted for movement in a direction perpendicular to the lengthwise direction of the engaging arm 176 and is biased by a coil spring 186 so as to protrude to the same side as the engaging portion 182.

A method of effecting permanent clamping of the clamp band 150 by the use of the clamp tool 190 will now be described with additional reference to FIGS. 16 and 17. As shown in FIG. 15, the clamp tool 190 is set so that the bifurcated portion 162 coincides with the normal to the aperture 148 in the provisionally clamped clamp band 150, and the engaging portion 182 of the engaging arm 176 is fitted into the aperture 122 in the end portion 110 and brought into engagement with the first clamping force acting portion 118 which is one end edge of the aperture 122. At this time, the pressing member 184 approaches the fore end of the end portion 110 from outside. Subsequently, a force is applied to the acting portion 165 (which is one end of the grip portion 164) to pivot the clamp tool 190 about the pin 168 clockwisely as viewed in FIG. 15 (shown by $165_1$–$165_5$ in FIG. 16), whereupon the pin 174 moves on the arc about the pin 168 as indicated by $174_1$–$174_5$ in FIG. 16. At this time, the engaging portion 182 of the engaging arm 176 moves as indicated by $182_1$–$182_5$ in FIG. 16. Along therewith, the angle $\theta$ formed between the bifurcated portion 162 and the engaging arm 176 becomes gradually smaller as indicated by $\theta_1$–$\theta_5$ in FIG. 16 and as a result, the tension applied from the engaging portion 182 of the engaging arm 176 to the end portion 110 becomes gradually greater. The reason for this will now be described with reference to FIG. 17.

Figure 17:
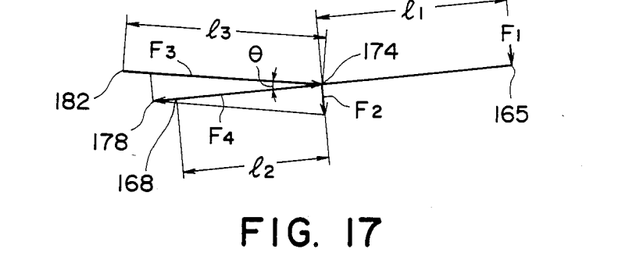
FIG. 17 illustrates a force acting on the clamp tool during permanent clamping.

In FIG. 17, when the force applied to the acting portion 165 of the grip portion 164 is $F_1$, and the distance from the pin 174 to the acting portion 165 is $l_1$ and the distance from the pin 168 to the pin 174 is $l_2$, the force $F_2$ applied to the pin 174 is $$F_2 = \frac{(l_1 + l_2)}{l_2} \times F_1 = \left(1 + \frac{l_1}{l_2}\right) F_1. \quad (1)$$

When the tension applied form the engaging arm 176 to the end portion 110 is $F_3$ and the angle formed between the bifurcated portion 162 and the engaging arm 176 is $\theta$, $$F_3 = (F_2/\sin \theta) \quad (2)$$

From equations (1) and (2), $$F_3 = \frac{\left(1 + \frac{l_1}{l_2}\right) \times F_1}{\sin \theta} \quad (3)$$

and as is apparent from equation (3), the tension $F_3$ to the end portion 110 approaches infinity as the angle $\theta$ approaches zero.

Figure 16:
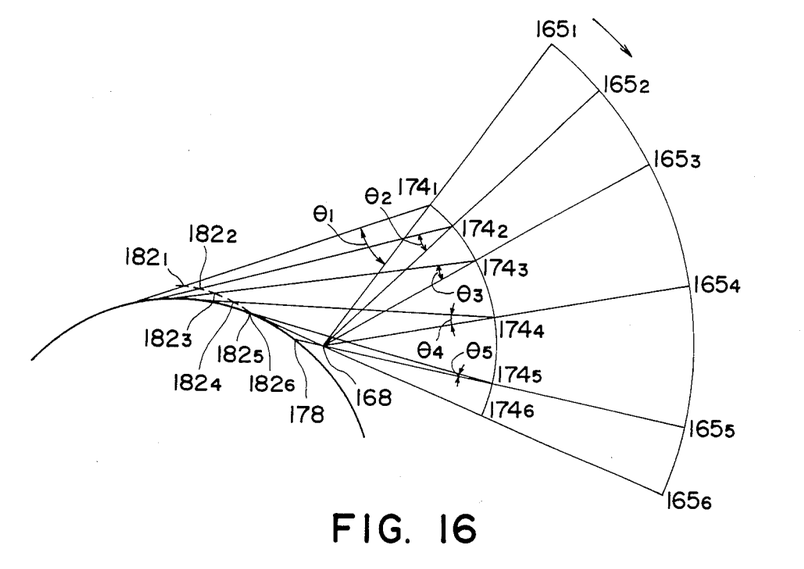
FIG. 16 illustrates the locus of rotation of the clamp tool during permanent clamping.
Figure 18:
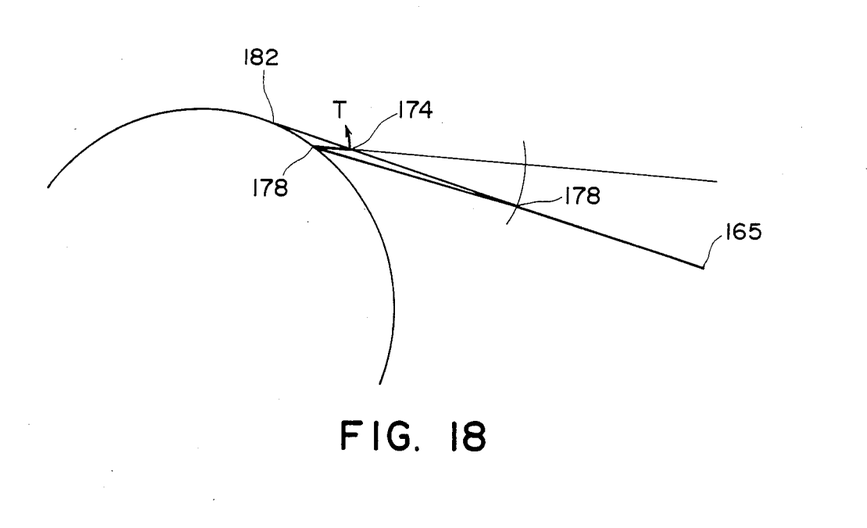
FIG. 18 illustrate a force acting on the clamp tool when permanent clamping is terminated.
Figure 19:
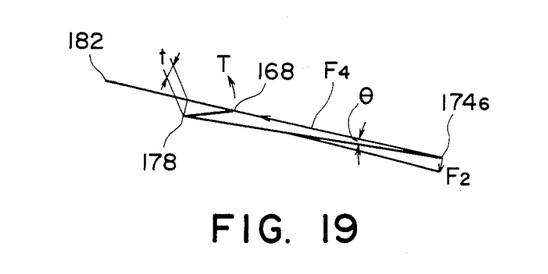
FIG. 19 is an enlarged view of portions of FIG. 18.

Next, when the clamp tool 150 is rotated and the acting portion 165 and the pin 174 arrive at their positions indicated by $165_5$ and $174_5$, respectively, in FIG. 16, the engaging portion 178, the pin 168, the pin 174 and the acting portion 165 stand on a straight line. When the clamp tool 190 is further rotated and the acting portion 165 and the pin 174 arrive at their positions indicated by $165_6$ and $174_6$, respectively, the engaging piece 172 is relatively pivoted counter-clockwisely with the second engaging portion 178 as the fulcrum and about the pin 168 by the reaction force of the band clamping force. As a result, the engaging portion 178 of the engaging piece 172 becomes disengaged from the second clamping force acting portion 146 of the end portion 130. The reason for this will now be set forth with reference to FIGS. 18 and 19.

Figure 20:
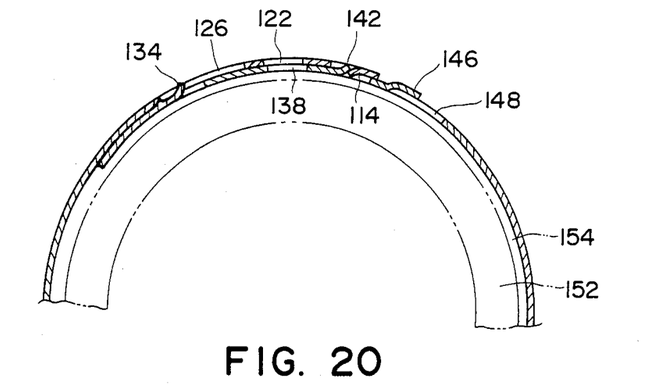
FIG. 20 is a cross-sectional view of the permanently clamped clamp band.

If the force applied to the engaging piece 172 when the acting portion 165 and the pin 174 are in their positions indicated in FIG. 16 by $165_6$ and $174_6$, respectively, is $F_4$ and the distance between the engaging portion 178 of the engaging piece and said straight line is t, a rotational moment $$T = F_4 \times t \quad (4)$$

is created in the engaging piece 172 about the pin 168. Accordingly, the engaging piece 172 which has so far been in contact with the second clamping force acting portion 146 is pivoted counter-clockwise about the pin 168 by said moment T and the engaging portion 178 becomes disengaged from the second clamping force acting portion 146 of the end portion 130. Thus, the restraint of the end portion 110 by the engaging arm 176 is released. At the same time, a resilient force is created in the clamp band 150 itself by the elastic deformation resisting force of the clamp member (boot) and the friction resisting force with respect to the clamp member, and the end portion 110 is pulled back leftwardly as viewed in FIG. 15. Therefore, the connecting projections 114 and 142 come into engagement with each other, thus completing permanent clamping as shown in FIG. 20.

In the process from provisional clamping to permanent clamping, the end portion 110 is prevented from drifting outward by a pressing member 184 mounted on the engaging arm 176. That is, the pressing member 184 is mounted in proximity to the fore end of the end portion 110 and presses the fore end toward the end portion 130 as the clamp tool 190 is rotated about the pin 168. The pressing of the end portion 110 by the pressing member 184 is resiliently accomplished by the action of the spring 186 and is maintained from the state of provisional clamping until the completion of permanent clamping (until the projections 114 and 142 become engaged with each other). When the pressing member 184 presses the fore end of the end portion 110, resistance results from the band body sliding on the clamp member when the end portion is pulled rightwardly, but the degree of intimate contact between the clamp band 150 and the rubber boot 154 is small in the range in which the angle $\theta$ (formed between the bifurcated portion 62 and the engaging arm 176) is great. Therefore, the tension resistance is very small. As the completion of permanent clamping is approached, that is, as said angle $\theta$ becomes smaller, the pressing force of the pressing member 184 becomes stronger. Thus, the tension resistance increases with the increase in the area and force of intimate contact between the band body and the clamp member on the end portions 110 and 130. However, at this point, as previously described, the force applied from the engaging arm 176 to the end portion 110 becomes greater, so that permanent clamping can be accomplished easily.

During provisional clamping and during the shift from provisional clamping to permanent clamping, the projection 134 on the end portion 130 is fitted and moves within the long aperture 126 in the end portion 110, and whereby relative widthwise deviation between the end portions 110 and 130 is prevetned. Also, if a strong curvature (smaller than the radius of the rubber boot 154, that is, $R_1 > R_2$) is imparted to the end portion 110 which provides the outer side during overlapping, it will become easy for the end portion 110 to intimately contact the inner side end portion 130 during provisional clamping and during the shift from provisional clamping to permanent clamping. This will better ensure engagement between the projection 134 and the engaging portion 124 as well as engagement between the projections 114 and 142.

Also, since the fore end of the inner side end portion 130 is tapered, it is easy for said fore end to bite into the rubber boot 154 during permanent clamping. Thus, by pulling the outer side end portion 110, clamping of the clamp band 150 can be accomplished and also the rubber boot can be clamped substantially uniformly. No force is applied to the projection 114 during the permanent clamping by the clamp tool 190, so the projection is not deformed (cocked up). Consequently, it is easy for the projection 114 to ride across the projection 142, and after the projection 114 has ridden across the projection 142, the projection 114 reliably becomes engaged with the connecting projection 142 due to the action of the pressing member 184. Since the projection 114 of the end portion 110 is formed on the fore end of the end portion 110, the projection 114 remains engaged with the projection 142 even after the removal of the clamp tool 190 and thereby maintains the state of permanent clamping (loop shape). Projection 114 is also effective to prevent the end portion 110 from drifting outward. Also, the second clamping force acting portion 146 is square-shaped and protrudes in the form of a tunnel, with the height of the protrusion being substantially the same as the thickness of the clamp band 150. It is therefore easy for the engaging portion 178 of the engaging piece 172 to enter the gap, and the engaging portion 178 is prevented from injuring the rubber boot 154. Further, the engaging piece 172 which provides the fulcrum during rotation of the clamp tool 190 contacts the inner side end portion 130 of the clamp band 150 over a relatively wide area so that the end portion 130 is prevented from being locally deformed.

The clamp tool 190 can also be used to remove the permanently clamped clamp band 150. That is, in FIGS. 14 and 15, with a pin inserted in the small aperture 173 in the engaging piece 172 to prevent reversal (leftward turning) of the engaging piece 172 to prevent the pressing member 184 from acting on the end portion 110, the engaging portion 182 of the clamp tool 190 may be brought into engagement with the engaging portion 118 and the engaging portion 178 may be brought into engagement with the engaging portion 146. A clockwise rotational force may be imparted to the acting portion 165, and then the clamp tool may be returned counterclockwise with the projections 114 and 142 being disengaged from each other. This is because the projections 114 and 142 are radially disengaged from each other by such a degree of bending that the root of the end portion 110 tends to open radially outwardly. At this time, the rubber boot 154 is not injured by the clamp band 150.

The dimensions $l_2$ and $l_3$ of the tool, both shown in FIG. 17, are determined with clamp allowance and clamping force of the clamp band 150, i.e., the magnitude of said angle $\theta$, etc., taken into account. When the permanent clamping diameter of the clamp band 150 is to be changed depending on the dimensions of the clamp member (e.g., boot), it is desirable that the dimensions $l_2$ and $l_3$ be made changeable.

Figure 21:
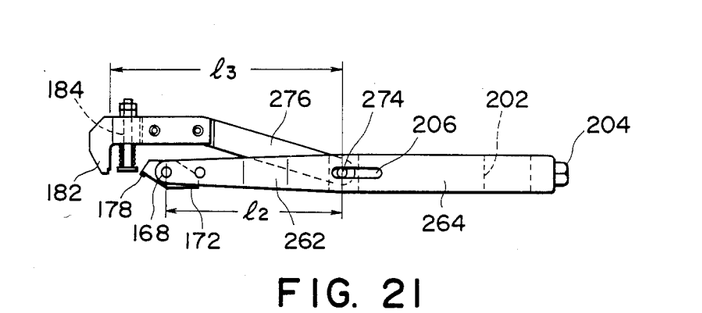
FIG. 21 is a front view showing a modification of the clamp tool.
Figure 22:
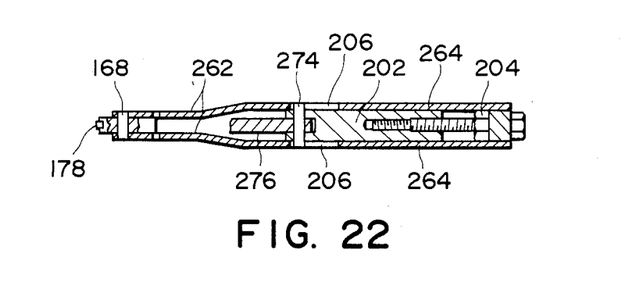
FIG. 22 is a cross-sectional view of the clamp tool shown in FIG. 21.

A clamp tool which can meet such a requirement will now be described with reference to FIGS. 21 and 22. In this modification, a grip portion 264 is square-shaped and a block 202 is inserted therein for movement in the lengthwise direction. A bolt 204 rotatably (but axially immovably) mounted in the grip portion 264 is threadably engaged with the block 202, such that rotation of the bolt 204 causes lengthwise movement of the block 202. A pin 274 is inserted in the fore end of the block 202 through the block, and the opposite ends of the pin 274 protrude from the side surfaces of the block 202 into engagement with lengthwise slots 206 formed in the grip portion 264. The rear end of an engaging arm 276 is pivotally mounted on the pin 274. The other portions of the tool are substantially similar to those of the clamp tool 150 shown in FIG. 15. When the bolt 204 is rotated, block 202 moves and the position of the pin 274 changes, whereby the dimensions $l_2$ and $l_3$ can be increased or decreased. The amounts of adjustment of the dimensions $l_2$ and $l_3$ can be selected as desired by adjusting the amount of rotation of the bolt 204.

Although the foregoing description sets forth the features of the preferred embodiments of the invention, it will be apparent to those skilled in the art that various changes are possible in keeping with the principles of the invention, the scope of which is defined in the appended claims.

We claim:

1. A clamp band adapted to be formed into a loop-like shape around a cylindrical member with a first end porion of the band overlapping a second end portion of the band to the outside of the second end portion, characterized in that:
   said first end portion has an inwardly directed first projection formed adjacent to a first aperture lengthwise of the band, and a rectangular second aperture which has a tool-engaging end edge and which is formed closer to a fore end of said first end portion than is said first projection,
   said second end portion has an outwardly directed second projection formed adjacent to a third aperture lengthwise of the band, and a protuberance which has a tool-engaging end edge adjacent to a rectangular fourth aperture lengthwise of the band and which is further than said second projection from the fore end of said second end portion,
   said tool-engaging end edges, said first and second projections, and said first and third apertures are disposed such that with the first and second end portions of the band partially overlapped, oppositely directed tangential clamping forces may be applied to said tool-engaging end edges by respective portions of a clamping tool to increase the amount of overlap of said end portions and thereby bring the band into a clamped state in which said first projection is received in said third aperture and said second projection is received in said first aperture, with a back part of said first projection engaging a back part of said second projection and the engaged projections supporting circumferential forces that would tend to separate the overlapped end portions of the band, and
   retaining means is provided for retaining said first end portion adjacent said second end portion to prevent said first end portion from drifting outward from said second end portion when the band is in said clamped state.

2. A clamp band according to claim 1, wherein said first and second projections are formed such that they do not protrude from the inner peripheral surface of said first end portion and the outer peripheral surface of said second end portion, respectively, when the band is in said clamped state.

3. A clamp band according to claim 1, wherein said first and second projections are formed by obliquely bent tongue-like pieces.

4. A clamp band according to claim 1, wherein said tool-engaging edges are disposed to be urged toward one another by said clamping forces to increase the amount of overlap of said first and second end portions of the band.

5. A clamp band according to claim 1, wherein said tool-engaging edges are disposed to be urged away from one another by said clamping forces to increase the amount of overlap of said first and second end portions of the band.

6. A clamp band according to claim 1, wherein a cover plate is secured to the inner peripheral surface of said second end portion and covers said aperture and said fourth aperture.

7. A clamp band according to claim 1, wherein said first and second end portions have cooperable provisional clamping means for maintaining the clamp band in a provisionally clamped state in which said first and second end portions are overlapped with the band having a greater circumference than when in the first-mentioned clamped state.

8. A clamp band according to claim 7, wherein said provisional clamping means comprises an outwardly directed third projection on said second end portion disposed to engage said first projection when the band is in said provisionally clamped state.

9. A clamp band according to claim 1, wherein said retaining means comprises a retaining member secured to the inner peripheral surface of said second end portion between said second projection and said tool-engaging end edge of said protuberance and having a pair of outwardly projecting portions for restraining said first end portion.

10. A clamp band according to claim 1, wherein said retaining means comprises a tunnel-like protuberance on said second end portion disposed further from the fore end of said second end portion than is the first-mentioned protuberance, and wherein the fore end of said first end portion is configured to be received within said tunnel-like protuberance of said retaining means.

11. A clamp band according to claim 1, wherein said protuberance of said second end portion is tunnel-like.

12. A clamp band according to claim 1 clamped about and fixing a cylindrical boot means to a circumferential surface of a transmission shaft of a vehicle.

13. A clamp band adapted to be formed into a loop-shape around a cylindrical member with a first end portion of the band overlapping a second end portion of the band to the outside of the second end portion, characterized in that said first end portion has an inwardly directed first projection near a fore end thereof and a rectangular aperture with a tool-engaging end edge formed further from the fore end of said first end portion than is said first projection, said second end portion has an outwardly directed second projection and a protuberance which has a tool-engaging end edge formed adjacent to a rectangular aperture lengthwise of the band and which is further than said second projection from the fore end of said second end portion, said tool-engaging edges and said first and second projections are disposed such that when said first end portion and said second end portion are partially overlapped, oppositely directed tangential clamping forces may be applied to said tool-engaging edges to increase the amount of overlap of said first and second end portions and thereby bring the band into a clamped state in which a back part of said first projection engages a back part of said second projection with the engaged projections supporting circumferential forces that would tend to separate the overlapped end portions of the band, and said protuberance is disposed so as to lie outside the region of overlap of said first and second end portions when the band is in said clamped state.

14. A clamp band according to claim 13, wherein said second end portion has an outwardly directed third projection disposed closer to the fore end of said second end portion than is said second projection, said third projection being engageable with said first projection in order to maintain the band in a provisionally clamped state with the band having a greater circumference than when in the first-mentioned clamped state.

15. A clamp band according to claim 13 clamped about and fixing a cylindrical boot means to a circumferential surface of a transmission shaft of a vehicle.

16. A clamp band according to claim 13, wherein said fore end of said first end portion is inwardly curved in a small radius.

* * * * *